United States Patent

[11] 3,633,549

[72] Inventor Veldon Morgan
 Ellsworth, Nebr. 69340
[21] Appl. No. 7,098
[22] Filed Jan. 30, 1970
[45] Patented Jan. 11, 1972

[54] ANIMAL HAIR-CONDITIONING COMB
 7 Claims, 3 Drawing Figs.
[52] U.S. Cl..................................................... 119/92
[51] Int. Cl................................................... A01k 13/00
[50] Field of Search........................................... 119/92;
 30/169, 171, 314, 317

[56] References Cited
 UNITED STATES PATENTS
 2,084,589 6/1937 Odgers........................ 30/171
 2,800,879 7/1957 Quick.......................... 119/92
 130,755 8/1872 Shippey....................... 119/92
 3,173,206 3/1965 Chambers..................... 30/169

FOREIGN PATENTS
 176,551 7/1935 Switzerland.................. 119/86
 449,580 6/1936 Great Britain................ 119/92

Primary Examiner—Hugh R. Chamblee
Attorneys—Clarence A. O'Brien and Harvey B. Jacobson ABSTRACT: An asymmetrical Y-shaped one-piece wire handle including a generally U-shaped handgrip defining base portion provided with a pair of generally parallel sides interconnected at one pair of corresponding ends by means of a curved integral bight portion. The free ends of the sides include extension arms angled oppositely away from each other with one of the arms being angularly displaced less than 30° relative to the corresponding side of the base portion and the other arm being angularly displaced more than 60° relative to its corresponding base portion side. An elongated flexible and toothed comb member is removably supported from and extends between the free ends of the arms and is inclined slightly relative to a plane disposed normal to the centerline of the base portion.

Veldon Morgan
INVENTOR

BY Clarence A. O'Brien
and Harvey B. Jacobson
Attorneys

ANIMAL HAIR-CONDITIONING COMB

The comb of the instant invention has been provided to enable shedding hair and dirt to be combed from an animal having a hair coat.

The comb is constructed so as to include a handle portion and a readily removable and replaceable comb blade which is supported from the handle portion. The handle portion is constructed from a single piece of heavy-gauge stiff but resilient wire provided with a single cross brace member and is adapted to support a conventional hacksaw blade therefrom as the comb portion.

Of course, hacksaw blades are presently produced with teeth of varying sizes and with various numbers of teeth per inch of length of the blade. It may therefore be seen that the animal hair-conditioning comb of the instant invention may be readily marketed primarily as a handle which may be utilized to support various types of hacksaw blades therefrom and which may be purchased, if desired, by persons intending to use hacksaw blades which have been discarded in favor of new sharper blades for metal cutting. In addition, inasmuch as the teeth on one hacksaw blade may be suited for one particular type of animal and larger or smaller teeth on another hacksaw blade will be adapted for use on another animal, the purchaser of an animal hair-conditioning comb constructed in accordance with the present invention may use one handle portion in conjunction with a plurality of different hacksaw blades in conditioning the hair on various types of animals.

The main object of this invention is to provide a hair-conditioning comb with replaceable comb blades for adapting the comb to be utilized on various types of haired animals.

Another object of this invention, in accordance with the immediately preceding object, it to provide a hair-conditioning comb including a handle portion from which new or discarded hacksaw blades of various types may be readily removably supported for the purpose of conditioning the hair on an animal.

A still further object of this invention is to provide a comb in accordance with the preceding objects and including means for supporting the hacksaw blade portion thereof in at least a slightly angulated position relative to a plane disposed normal to the longitudinal centerline of the handle of the comb.

A further object of this invention is to provide an animal hair-conditioning comb which will not only be operative to comb animal hair and remove shedding hair but which will also be operative to remove dirt from the hair of an animal in an improved manner.

A final object of this invention to be specifically enumerated herein is to provide an animal hair-conditioning comb in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
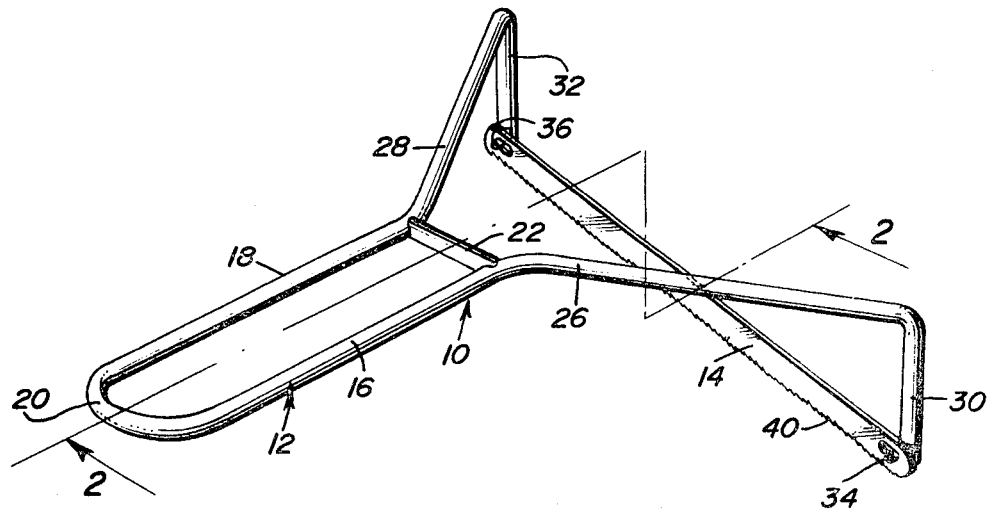
FIG. 1 is a perspective view of the comb of the instant invention.
Figure 2:
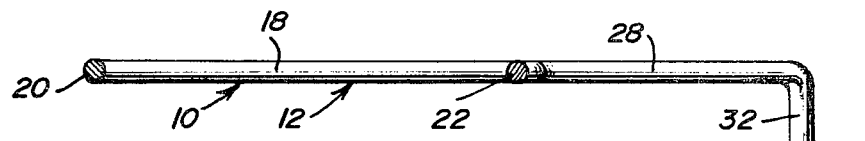
FIG. 2 is a longitudinal vertical sectional view taken substantially upon the plane indicated by the section line 2—2 of FIG. 1.

Referring now more specifically to the drawings, the numeral 10 generally designates the comb of the instant invention which may be seen in the drawings to include an elongated handle referred to in general by the reference numeral 12 and an elongated blade member 14.

The handle 12 is generally U-shaped in configuration and includes a pair of opposite longitudinal sides 16 and 18 interconnected at one pair of corresponding ends by means of an integral curved bight portion 20.

The ends of the sides 16 and 18 remote from the bight portion 20 are interconnected by means of a transverse brace 22 extending therebetween and the sides 16 and 18 include oppositely angulated arms 26 and 28 defining extensions of the sides 16 and 18. The arms 26 and 28 are disposed in the same plane as the sides 16 and 18 and terminate at their free ends in downwardly directed end portions 30 and 32 whose lower ends carry generally parallel laterally outwardly and rearwardly projecting mounting pins 34 and 36. In addition, the lower ends of the end portions 30 and 32 are flattened as at 38 in the areas surrounding the pins 24 and 36 and the pins project outwardly from the flattened areas 38.

Figure 3:
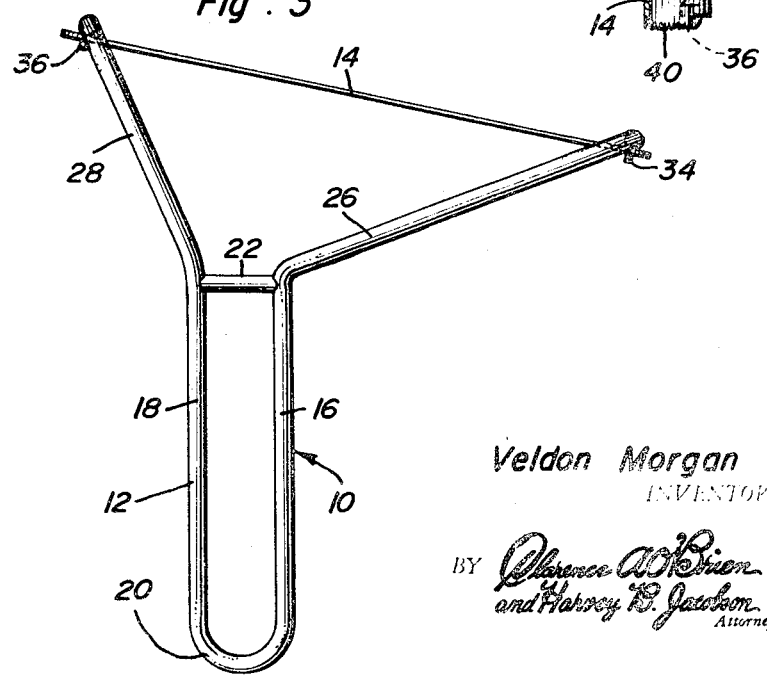
FIG. 3 is a top plan view of the comb.

As may best be seen from FIG. 3 of the drawings the arm 28 is inclined relative to the side 18 less than 30° and the arm 26 is inclined relative to the side 16 more than 60°. Further, it may be observed that the sides 16 and 18, the bight portion 20, the arms 26 and 28 and the end portions 30 and 32 are formed from a single piece of heavy-gauge stiff but somewhat resilient wire material.

The blade 14 comprises a conventional hacksaw blade including a plurality of longitudinally spaced teeth 40 and as is conventional the teeth 40 are inclined toward one end of the blade 14. Hacksaw blades may be readily purchased with 18, 24 or 32 teeth per inch and a particular hacksaw blade will perform a better job of combing a given haired animal. Accordingly, one type of hacksaw blade might be used for horses and another type of hacksaw blade might be used for cows.

From FIG. 3 of the drawings it will be observed that the blade 14 is slightly inclined relative to a plane disposed normal to the longitudinal centerline of the handle 12. This inclination of the blade 14 will enable the user of the comb 10 when pulling the latter in a straight line along which the handle 12 projects, to drag dirt and loose hair from a haired animal. The condition of the hair of the animal to be combed will determine in which position the blade 14 is to be mounted. In one position the teeth 40 will be slightly advanced through the hair and in the reverse position the teeth 40 will be slightly trailed through the hair. In addition, according to the force applied in pressing the comb 10 on the animal being combed, the blade 14 will be convexed away from the direction of movement of the comb 10 and will thus tend to conform to a curved body portion if the handle 12 is slightly inclined relative to the direction of movement. Further, it will be noted that when the blade 14 bends, the distance between the end portions 30 and 32 will be reduced whereby the somewhat resilient arms 26 and 28 will have their free ends urged slightly toward each other. In this manner, an automatic shock-absorbing feature is built into the comb so that the comb will yield under more than average resistance to the movement of the blade over the body of the haired animal being combed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An animal hair-conditioning comb comprising an elongated handle including a pair of endwise outwardly projecting and divergent arms at one end, said arms being generally coplanar and constructed of stiff but resilient material, and an elongated stiff but resilient and toothed blade member secured between the outer ends of said arms with the teeth thereof disposed generally normal to a plane containing said arms and the free ends of said teeth facing and disposed outwardly of one side of said plane, said blade member being straight and inclined in said plane from a position disposed generally normal to the longitudinal axis of said handle, said blade including opposite side longitudinal edges, said teeth being spaced along and projecting endwise outwardly from one of said edges, said outer ends of said arms including lateral extensions disposed generally normal to said plane and projecting outwardly to said one side thereof, said blade member being supported from the free ends of said extensions.

2. The combination of claim 1 wherein said handle comprises a generally U-shaped member including a pair of generally parallel legs interconnected at one pair of corresponding ends thereof by means of an integral curved bight portion extending therebetween, said arms comprising integral oppositely angulated extensions of the other pair of corresponding ends of said legs.

3. An animal hair-conditioning comb comprising an elongated handle including a pair of endwise outwardly projecting and divergent arms at one end, said arms being generally coplanar and constructed of stiff but resilient material, and an elongated stiff but resilient and toothed blade member secured between the outer ends of said arms with the teeth thereof disposed generally normal to a plane containing said arms and the free ends of said teeth facing and disposed outwardly of one side of said plane, said handle comprising a generally U-shaped member including a pair of generally parallel legs interconnected at one pair of corresponding ends thereof by means of an integral curved bight portion extending therebetween, said arms comprising integral oppositely angulated extensions of the other pair of corresponding ends of said legs, said blade member being inclined in said plane from a position disposed generally normal to the longitudinal axis of said handle, the arm from which the end of said blade member inclined away from said handle is supported being inclined less than 30° relative to the corresponding leg and the other arm being inclined more than 60° relative to its corresponding leg.

4. The combination of claim 3 wherein said outer ends of said arms include lateral extensions disposed generally normal to said plane and projecting outwardly to said one side thereof, said blade member being supported from the free ends of said extensions.

5. An animal hair-conditioning comb comprising an elongated handle including a pair of endwise outwardly projecting and divergent arms at one end, said arms being generally coplanar and constructed of stiff but resilient material, and an elongated stiff but resilient and toothed blade member secured between the outer ends of said arms with the teeth thereof disposed generally normal to a plane containing said arms and the free ends of said teeth facing and disposed outwardly of one side of said plane, said outer ends of said arms including lateral extensions disposed generally normal to said plane and projecting outwardly to said one side thereof, said blade member being supported from the free ends of said extensions, said lateral extensions including outwardly projecting mounting pins on their free ends, said pins being disposed generally normal to said blade member and projecting toward the other end of said handle at their free ends, said blade member including opposite end apertures formed therethrough in which said mounting pins are received.

6. The combination of claim 5, wherein said handle comprises a generally U-shaped member including a pair of generally parallel legs interconnected at one pair of corresponding ends thereof by means of an integral curved bight portion extending therebetween, said arms comprising integral oppositely angulated extensions of the other pair of corresponding ends of said legs, and mean rigidly interconnecting said other pair of corresponding ends of said legs.

7. The combination of claim 6, wherein said blade member comprises a hacksaw blade.

* * * * *